(12) United States Patent
Suzuki et al.

(10) Patent No.: US 7,432,804 B2
(45) Date of Patent: Oct. 7, 2008

(54) EMERGENCY NOTIFICATION APPARATUS FOR VEHICLE

(75) Inventors: Takeyuki Suzuki, Utsunomiya (JP); Masayuki Sato, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 249 days.

(21) Appl. No.: 11/510,353

(22) Filed: Aug. 25, 2006

(65) Prior Publication Data

US 2007/0046457 A1     Mar. 1, 2007

(30) Foreign Application Priority Data

Aug. 30, 2005     (JP)     ............................ P2005-249011

(51) Int. Cl.
*G08B 1/08*     (2006.01)
(52) U.S. Cl. ........................ 340/539.1; 340/988; 701/1
(58) Field of Classification Search ............. 340/539.1, 340/902, 426.19, 988; 701/1
See application file for complete search history.

(56) References Cited

U.S. PATENT DOCUMENTS 7,289,786 B2 * 10/2007 Krasner ................... 455/404.2

2002/0115423 A1 * 8/2002 Hatae et al. ................. 455/404
2005/0088318 A1 * 4/2005 Liu et al. ..................... 340/902

FOREIGN PATENT DOCUMENTS

JP     06-036185     2/1994

* cited by examiner

*Primary Examiner*—Phung Nguyen
(74) *Attorney, Agent, or Firm*—O'Melveny & Myers LLP

(57) ABSTRACT

An emergency notification apparatus for a vehicle includes: a receiver provided in a subject vehicle, being adapted to receive emergency information from another vehicle; a transmitter provided in the subject vehicle, being adapted to transmit the emergency information received by the receiver to a predetermined emergency information center via a base station for wireless communication; a navigation device which navigates the subject vehicle to a predetermined destination; and a controller which controls the navigation device so as to set a communicable area of the base station as the destination when the receiver receives the emergency information outside of the communicable area and controls the transmitter so as to transmit the emergency information via the base station after the subject vehicle reaches the communicable area guided by the navigation device.

3 Claims, 6 Drawing Sheets

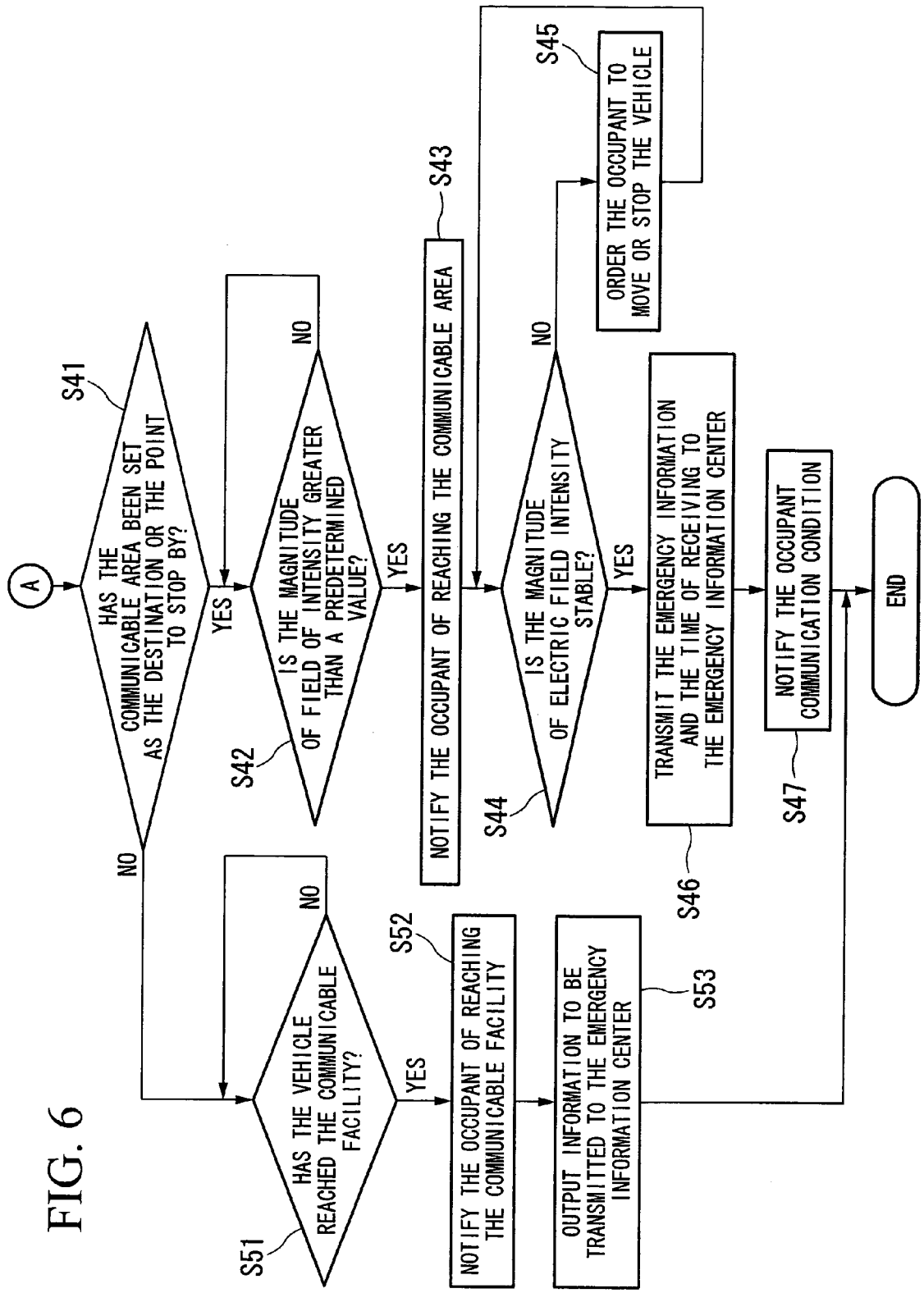

EMERGENCY NOTIFICATION APPARATUS FOR VEHICLE

BACKGROUND OF THE INVENTION

1. Field of the Invention

The present invention relates to an emergency notification apparatus for a vehicle.

Priority is claimed on Japanese Patent Application No. 2005-249011, filed Aug. 30, 2005, the content of which is incorporated herein by reference.

2. Description of Related Art

A notification system for a vehicle is known which is adapted to transmit emergency information to a base station for wireless communication when receiving the emergency information from another vehicle by vehicle-to-vehicle communication (see, for example, Japanese Unexamined Patent Application, First Publication No. H06-36 185). This system is adapted to transmit the emergency information to yet other vehicles when it is impossible to communicate with the base station.

This system of the related art only transmits emergency information to other vehicles if it is impossible to transmit the emergency information to a base station, for example, because the vehicle installed with the system is outside of the communicable area of the base station. Therefore, in a case in which there is no vehicle in the communicable area of the base station, the emergency information cannot be relayed to the base station and the transmission of the emergency information is delayed.

SUMMARY OF THE INVENTION

The present invention was made in view of the aforementioned circumstances, and has as an object to provide an emergency notification apparatus for a vehicle which can securely and swiftly transmit emergency information received from another vehicle.

A first aspect of the present invention is an emergency notification apparatus for a vehicle, including: a receiver provided in a subject vehicle, being adapted to receive emergency information from another vehicle; a transmitter provided in the subject vehicle, being adapted to transmit the emergency information received by the receiver to a predetermined emergency information center via a base station having a wireless communication function; a navigation device which navigates the subject vehicle to a predetermined destination; and a controller which controls the navigation device so as to set a communicable area of the base station as the destination when the receiver receives the emergency information outside of the communicable area and controls the transmitter so as to transmit the emergency information via the base station after the subject vehicle reaches the communicable area guided by the navigation device.

The aforementioned emergency notification apparatus of the present invention navigates the subject vehicle which receives emergency information from another vehicle to a position in the communicable area of the base station when the subject vehicle is outside of the communicable area. Therefore, the emergency information can be securely and swiftly transmitted to the emergency information center via the base station.

The emergency notification apparatus of the present invention may further include a determination device provided in the subject vehicle, which determines whether the communicable area or a facility having a communication device around the subject vehicle is more effective in transmitting the emergency information to the emergency information center, wherein the controller controls the navigation device so as to set one of the communicable area and the facility as the destination based on a determination result of the determination device.

In this case, when the subject vehicle outside of the communicable area receives the emergency information from another vehicle, the determination device determines which is more effective between transmitting the emergency information to the emergency information center via the base station after reaching the communicable area or transmitting the emergency information via a facility (for example, a public facility) having a suitable communication device (for example, a telephone line or a wireless communication device) after moving to the facility. Since the subject vehicle is navigated based on the determination result, the emergency information can be effectively transmitted to the emergency information center.

The determination device may compare the distance between the subject vehicle and the communicable area with the distance between the subject vehicle and the facility.

BRIEF DESCRIPTION OF THE DRAWINGS

FIG. 6 is a flowchart of operations for guiding a vehicle and for emergency notification.

DETAILED DESCRIPTION OF THE INVENTION

Figure 1:
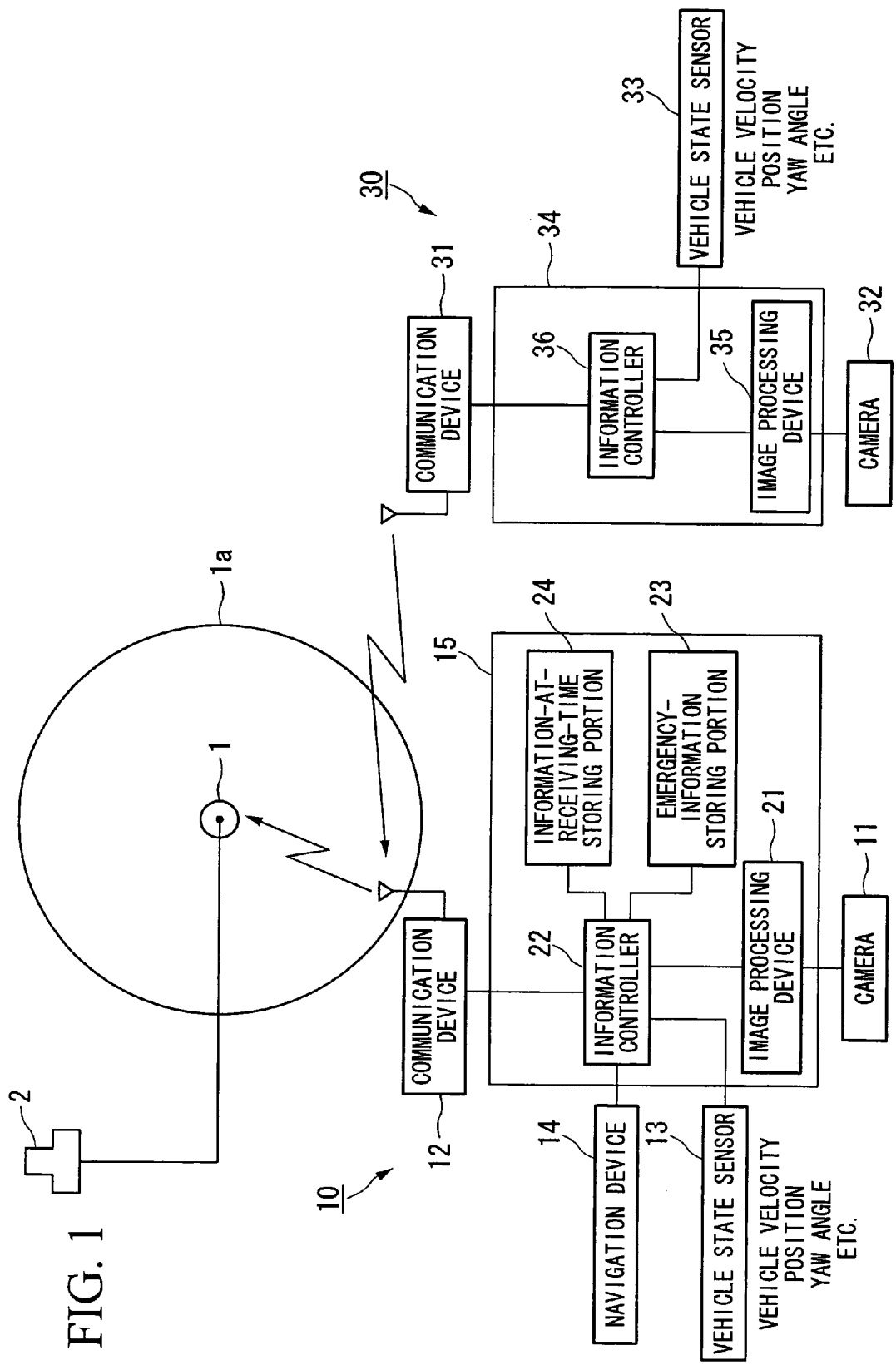
FIG. 1 is a schematic drawing showing a constitution of an emergency notification apparatus of an embodiment of the present invention.

An emergency notification apparatus for a vehicle according to an embodiment of the present invention shall be described herein below with reference to the accompanying drawings.

An emergency notification apparatus 10 of the present embodiment has a camera 11 which captures views around a vehicle, a communication device 12, a vehicle state sensor 13, a navigation device 14, and a processing device 15.

The camera 11 is a CCD camera, CMOS camera, or the like. The camera 11 captures views around the vehicle (the subject vehicle) through the window thereof and outputs captured image data.

The communication device 12 receives and transmits various kinds of information through vehicle-to-vehicle communication with other vehicles and communication with a base station 1 having a wireless communication function.

The base station 1 is an antenna tower, or the like, for cellular phones, having a wireless communication device used to communicate with the communication device 12 of the vehicle and a wire communication device for forwarding, information including emergency information received from vehicles, to an emergency information center 2. In other words, a plurality of the base stations 1 are connected so as to be able to perform wire communication with the emergency information center 2 in order to collect information. The emergency information center 2 shall be described later.

The vehicle state sensor 13 has a constitution provided with a velocity sensor that detects the velocity (vehicle velocity) of the vehicle; a position sensor that detects the present position and travel direction of the vehicle based on a positioning signal such as a global positioning system signal that measures the position of the vehicle using a satellite and a position signal transmitted from an information transmitter on the exterior of the vehicle, and moreover the detection result of an appropriate gyro sensor and acceleration sensor; a yaw rate sensor that detects the yaw angle (angle of rotation of the vehicle's center of gravity about the vertical axis) and the yaw rate (angular velocity of the vehicle's center of gravity about the vertical axis); and a steering angle sensor that detects the steering angle (magnitude in the direction of steering angle input by the driver) and the actual steering angle corresponding to the steering angle.

The navigation device 14 stores road-data including data including widths of roads, crossing angles of the roads, and shapes and positions of the intersections as map-data for displaying a map in its display (not illustrated). The navigation device performs a map-matching to the road-data based on the present position of the vehicle detected by the vehicle state sensor 13 and adjusts a displaying position of the vehicle in the display. The navigation device 14 controls a map-display based on the present position of the vehicle detected by the vehicle state sensor 13, or input made by an occupant using switches or a keyboard.

The navigation device 14 also performs calculations for path finding based on a destination and a point to be passed through which are input by the occupant or output from the processing device 15. The navigation device 14 displays information about a path to the destination and the point to be passed through, and various other kinds of information relating to the road-data, and navigates the occupant by outputting audible messages from speakers (not illustrated).

The constitution of the processing device 15 is described hereinbelow.

An image processing device 21 performs specific image processing such as filtering and binarization of the images obtained by imaging of the camera 11, generates image data consisting of two-dimensionally arranged pixels, and outputs the image data to an information controller 22.

The information controller 22 determines the position of another vehicle in the vicinity of the vehicle by vehicle-to-vehicle communication through the communication device 12 and stores the result in an information-at-receiving-time storing portion 24. When receiving emergency information from another vehicle, the information controller 22 stores the emergency information in an emergency-information storing portion 23, outputs a message notifying the occupant that the vehicle has received the emergency information in the display of the navigation device 14 and/or from the speakers, and displays information about the position of the other vehicle obtained from the emergency information in the display.

The information controller 22 also records the time of receiving the emergency information, the state (such as the position and the velocity) of the vehicle measured by the vehicle state sensor 13 at the time of receiving, and the image data obtained by the camera 11 at the time of receiving in the storing portion 24.

The emergency information transmitted from the other vehicle includes the position of the other vehicle, the type and characteristics of the other vehicle, messages indicating the content of the emergency, the time of transmission or occurrence of the emergency, and image data obtained by capturing the surroundings of the other vehicle.

When receiving the emergency information, the information controller 22 determines whether the vehicle is in a communicable area 1a of the base station 1 for wireless communication (an area in which the base station 1 can perform wireless communication) by determining whether or not a communication condition to the base station 1 (such as the magnitude and alteration thereof from moment to moment of the electric field intensity of the radio waves transmitted from the base station 1) is a predetermined condition. If the vehicle is in the communicable area 1a, the information controller 22 transmits the emergency information stored in the storing portion 23 and the information stored in the storing portion 24 to the emergency information center 2 through the base station 1.

On the other hand, if the vehicle is outside the communicable area 1a, the information controller 22 searches the base station 1 or the communicable area 1a near the vehicle and facilities (such as a police box, a public institute, a public phone, or a private residence) having a suitable communication device (for example, a telephone or a wireless communication device) based on the map-data of the navigation device 14.

Then the information controller 22 determines which is more efficient (for example, taking a shorter period of time) to transmit the emergency information to the emergency information center 2 via the base station 1 found by the search after reaching the communicable area 1a or to perform the same from a facility having a suitable communication device (hereinafter, simply referred to as "communicable facility") found by the search after reaching the communicable facility. In accordance with the result, the information controller 22 sets one of the communicable area 1a and the communicable facility as a destination or a point to be passed through to the navigation device 14. The navigation device 14 performs calculations for path finding and executes navigation in accordance with the path obtained by the calculation.

When the vehicle reaches inside the communicable area 1a during the aforementioned navigation, the information controller 22 outputs a message notifying the occupant that the vehicle has reached inside the communicable area of the base station 1 in the display of the navigation device 14 and/or from the speakers, and transmits the emergency information stored in the storing portion 23 and the information stored in the storing portion 24 to the emergency information center 2 through the base station 1.

When the vehicle reaches the communicable facility during the aforementioned navigation, the information controller 22 outputs a message notifying the occupant that the vehicle has reached the communicable facility in the display of the navigation device 14 and/or from the speakers, organizes information to be transmitted to the emergency information center 2 (such as information required for emergency vehicles to go to the other vehicle, including the position of the other vehicle, time of transmission of emergency information, the type of the other vehicle, receiving time of the emergency information; hereinafter, simply referred to as "information for facility communication") based on the emergency information stored in the storing portion 23 and the information stored in the storing portion 24, and outputs the information for facility communication in the display of the navigation device 14, from the speakers, or from an appropriate printing device (not illustrated).

The information controller 22 generates the information for facility communication so as to include contents which the occupant can explain orally.

The other vehicle which transmits the emergency information to the vehicle through vehicle-to-vehicle communication has an emergency notification device 30 which includes a communication device 30 which can transmit the emergency information through vehicle-to-vehicle communication and the base station 1 for wireless communication, a camera 32 which captures views around the other vehicle and outputs image data, a vehicle state sensor 33 which detects vehicle states such as vehicle velocity and position, and a processing device 34. The processing device 34 includes an image processing device 35 which performs predetermined processing on the image data obtained by the camera 32 and an information controller 36 which generates the emergency information when an emergency has occurred and controls the communication device 31 so as to transmit the emergency information.

The emergency notification apparatus 10 of the present embodiment has the aforementioned constitution, and the operations thereof shall be described hereinbelow.

Figure 2:
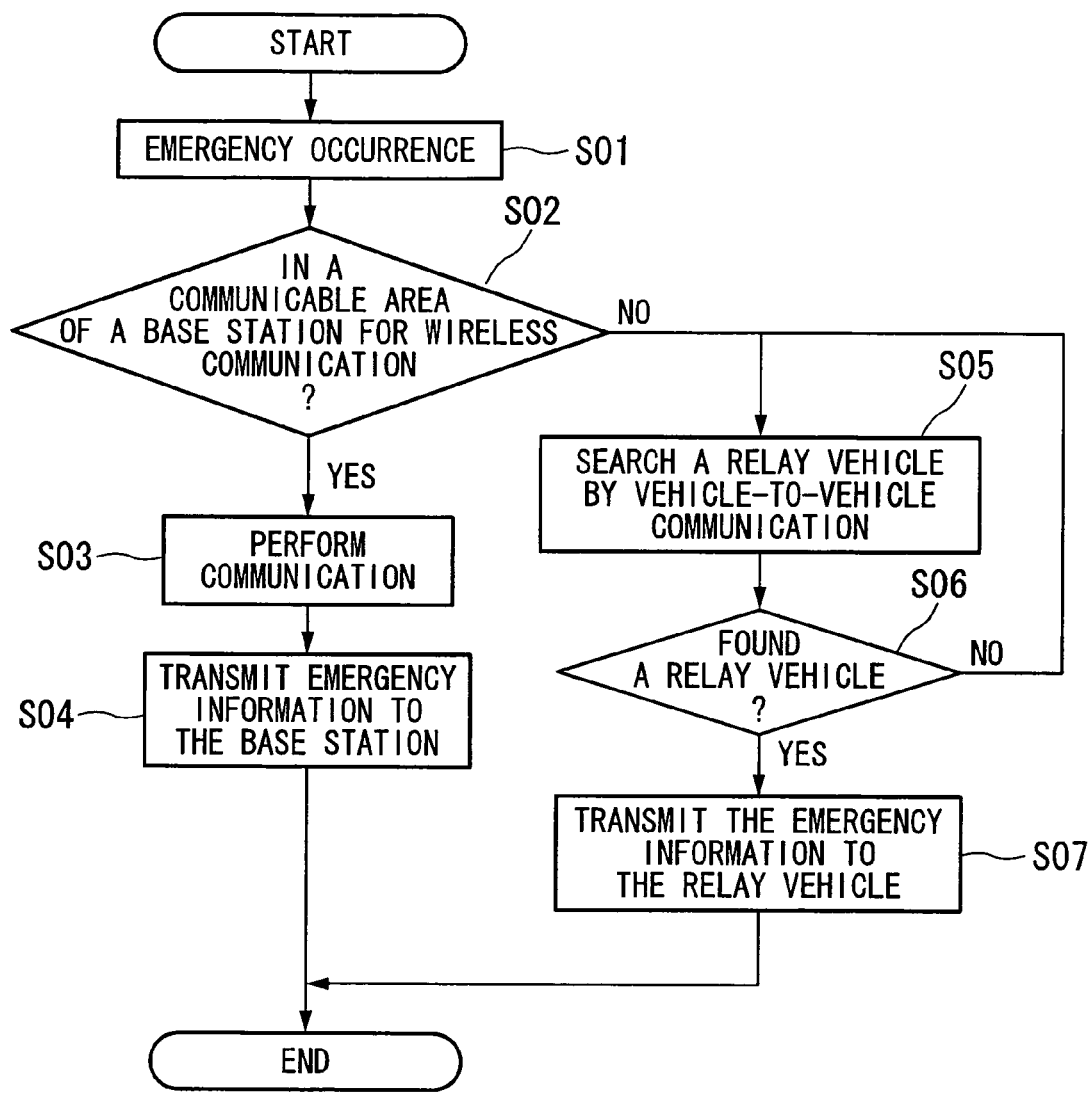
FIG. 2 is a flowchart of a processing of a vehicle in an emergency transmitting emergency information.

First, the process by which the other vehicle transmits the emergency information when an emergency such as vehicle accident or injury to the occupant has occurred is described with reference to FIG. 2.

In step S01, the information controller 36 detects the aforementioned emergency.

In step S02, the information controller 36 determines whether the other vehicle (vehicle B) is in the communicable area 1a of the base station 1 by determining whether or not a communication condition to the base station 1 (such as the magnitude and alteration thereof from moment to moment of the electric field intensity of the radio waves transmitted from the base station 1) is a predetermined condition.

If this determination result is "YES", the process proceeds to step S03.

If this determination result is "NO", the process proceeds to step S05, which will be described later.

In step S03, the information controller 36 starts the communication between the other vehicle and the base station 1.

In step S04, the information controller 36 transmits the emergency information including the position of the other vehicle, the type and characteristics of the other vehicle, the condition of the other vehicle, the time of transmission, and the image data obtained by the camera 32 to the base station 1 via the communication device 31 and terminates the processing.

In step S05, the information controller 36 searches for other vehicles (vehicles C, D, . . . ) to relay the emergency information (hereinafter, simply referred to as "relay vehicle") in the vicinity of the other vehicle (vehicle B) by vehicle-to-vehicle communication.

In step S06, the information controller 36 determines whether or not there are any relay vehicles in the vicinity of the other vehicle.

If this determination result is "YES", the process proceeds to step S07.

If this determination result is "NO", the process proceeds to the aforementioned step S05.

In step S07, the information controller 36 transmits the emergency information described in step S04 to the base station 1 via the communication device 31 and terminates the processing.

Operations of the emergency notification apparatus 10 of the present invention when receiving the emergency information from the other vehicle in an emergency are described.

Figure 3:
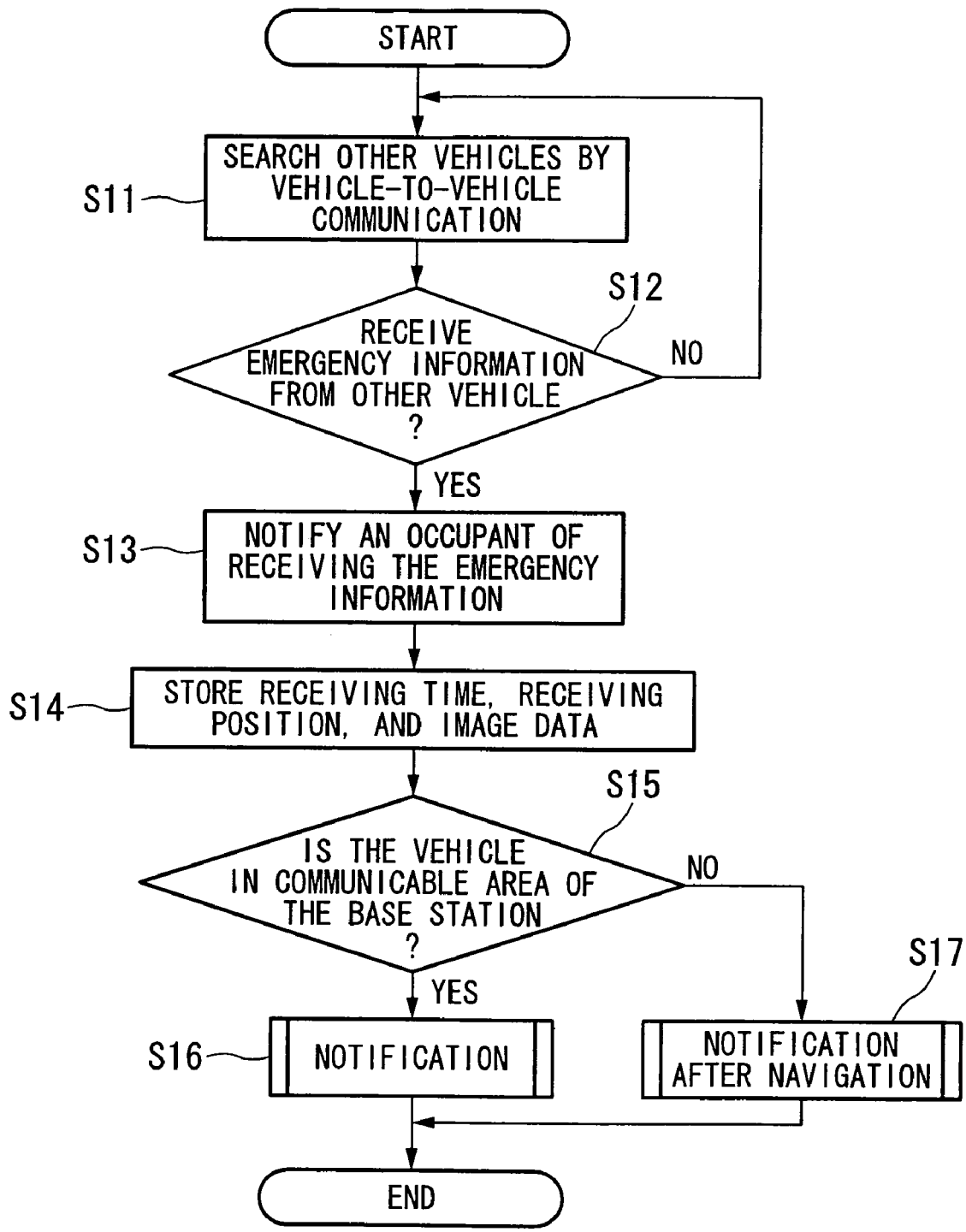
FIG. 3 is a flowchart of an operation of an emergency notification apparatus for a vehicle which receives emergency information transmitted from another vehicle in an emergency.

In step S11 in FIG. 3, the information controller 22 detects the position of the other vehicle (vehicle B) in the vicinity of the vehicle (vehicle A) by vehicle-to-vehicle communication.

In step S12, the information controller 22 determines whether or not the communication device 12 receives the emergency information from the other vehicle.

If this determination result is "NO", the process returns to the aforementioned step S11. On the other hand, if this determination result is "YES", the process proceeds to step S13.

In step S13, the information controller 22 stores the emergency information in the emergency-information storing portion 23 and outputs a message notifying the occupant that the vehicle has received the emergency information in the display of the navigation device 14 and/or from the speakers. In addition, information about the position of the other vehicle obtained from the emergency information is displayed in the display of the navigation device with the map-data.

In step S14, the information controller 22 stores the time of receiving the emergency information, the position and the state of the vehicle measured by the vehicle state sensor 13 at the time of receiving, and the image data obtained by the camera 11 at the time of receiving in the information-at-receiving-time storing portion 24.

In step S15, the information controller 22 determines whether the vehicle is in a communicable area 1a of the base station 1 for wireless communication by determining whether or not a communication condition to the base station 1 (such as the magnitude and alteration thereof from moment to moment of the electric field intensity of the radio waves transmitted from the base station 1) is a predetermined condition.

If this determination result is "YES", the process proceeds to step S16. In step S16, the processing device 15 performs a notification, which will be described later, and terminates the process.

If the determination results are "NO", the process proceeds to step S17. In step S17, the processing device performs a notification after navigation, which will be described later, and terminates the process.

The notification aforementioned in step S16 is now described.

Figure 4:
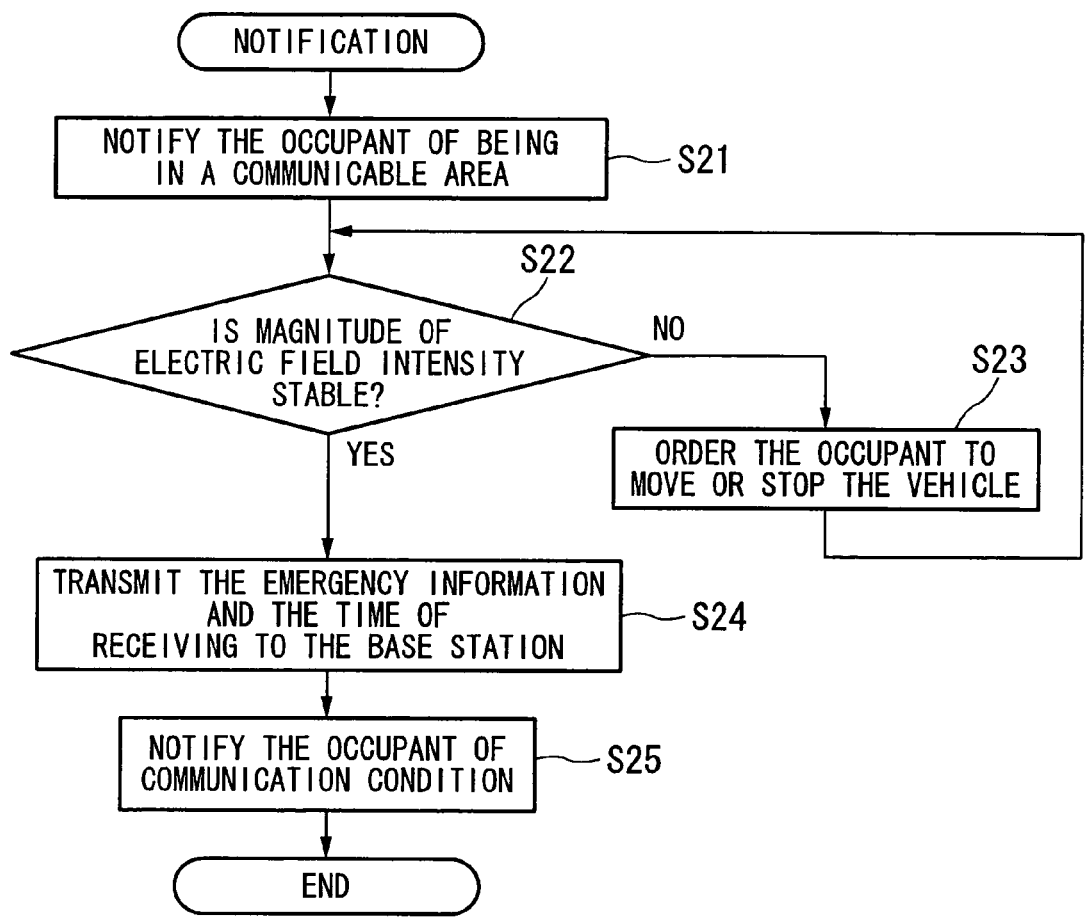
FIG. 4 is a flowchart of the emergency notification operation shown in FIG. 3.
Figure 5:
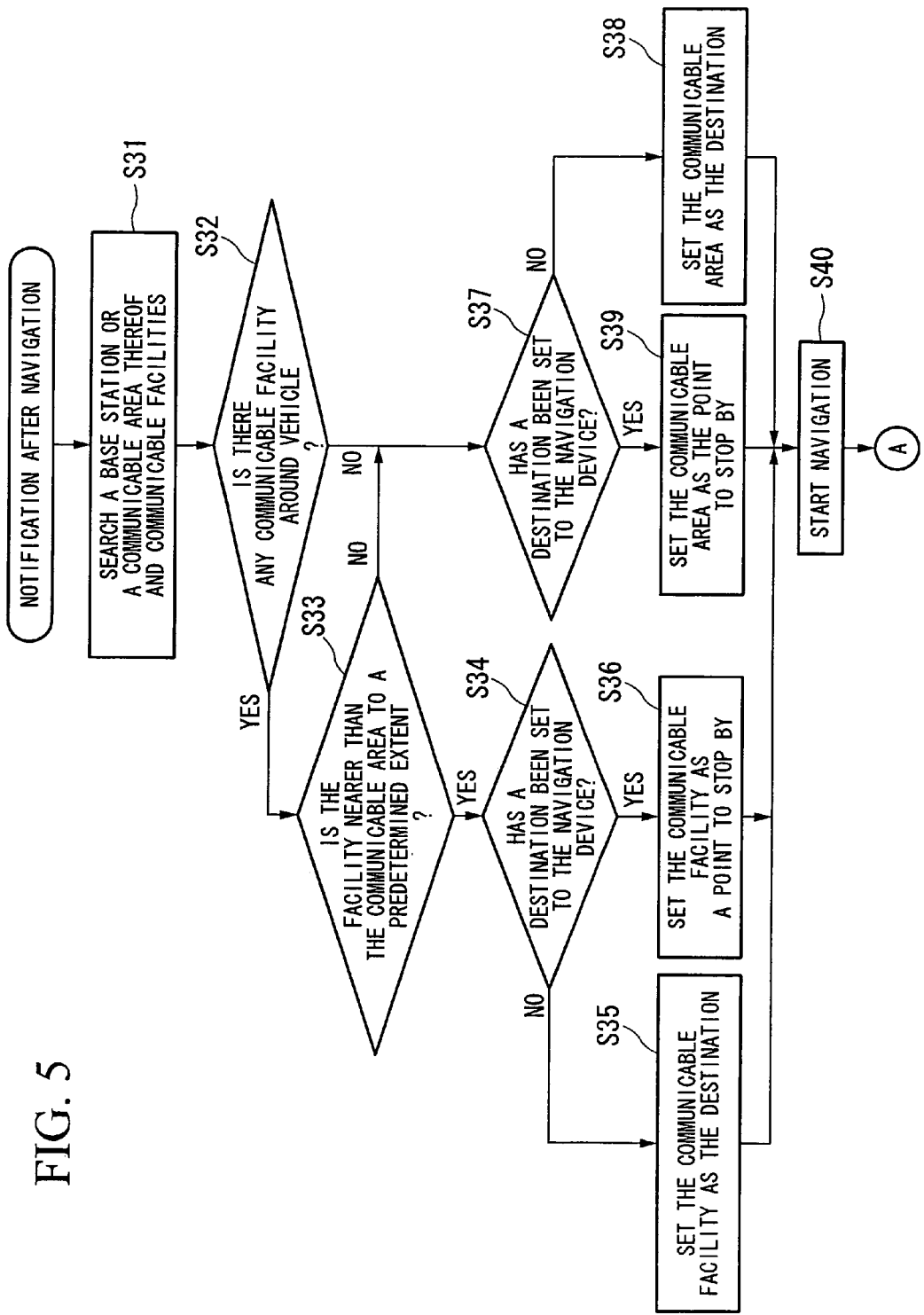
FIG. 5 is a flowchart of operations for guiding a vehicle and for emergency notification.

In step S21 in FIG. 4, the information controller 22 outputs a message notifying the occupant of the vehicle in the communicable area 1a bay way of the display of the navigation device 14 and/or from the speakers.

In step S22, the information controller 22 determines whether or not the vehicle is in a stable condition in which the magnitude and alteration thereof from moment to moment of the electric field intensity of the radio waves transmitted from the base station 1 is less than a predetermined value.

If this determination result is "NO", the process proceeds to step S23. In step S23, the information controller 22 orders the occupant to decelerate or stop when the vehicle is traveling, or to move and to brake when the vehicle is stopping via the navigation device 14, and the process returns to step S22.

If this determination result is "YES", the process proceeds to step S24.

In step S24, the information controller 22 transmits the emergency information stored in the storing portion 23 in step S13 and the information stored in the storing portion 24 in step S14 to the emergency information center 2 via the base station 1.

In step S25, the information controller 22 outputs a message notifying the occupant of a communication state such as ongoing or completed in the display of the navigation device 14 and/or from the speakers, and terminates the process.

The aforementioned notification after navigation in step S17 is now described.

In step S31, shown in FIG. 4, the information controller 22 searches the base station 1 or the communicable area 1a in the vicinity of the vehicle and the communicable facilities based on the map-data of the navigation device 14.

In step S32, the information controller 22 determines whether or not there is a communicable facility in the vicinity of the vehicle based on the search result in step S31.

If this determination result is "NO", the process proceeds to step S37, which will be described later. If this determination result is "YES", the process proceeds to step S33.

In step S33, the information controller 22 determines which is more efficient: communicating via the communicable facility or via the base station 1 for transmitting the emergency information to the emergency information center 2 by determining whether or not the communicable facility is nearer than the communicable area 1a by a predetermined distance.

If this determination result is "NO", that is, the communicable area 1a is nearer than or substantially equidistant to the communicable facility from the vehicle and it is more efficient to transmit the emergency information to the center 2 via the base station 1 after moving inside the communicable area 1a than to move to the communicable facility and transmit the emergency information to the center 2 from the communicable facility, the process proceeds to step S37.

On the other hand, if this determination result is "YES", that is, the communicable area 1a is further than the communicable facility by the predetermined distance from the vehicle and it is more efficient to move to the communicable facility and transmit the emergency information to the center 2 from the communicable facility than to transmit the emergency information to the center 2 via the base station 1, the process proceeds to step S34.

In step S34, the information controller 22 determines whether or not a destination has been set to the navigation device 14.

If this determination result is "NO", the process proceeds to step S35. In step S35, the information controller 22 sets the communicable facility as the destination of the navigation and the process proceeds to step S40, which will be described later.

If this determination result is "YES", the process proceeds to step S36. In step S36, the information controller 22 sets the communicable facility as a point to stop by before reaching the previously set destination, and the process proceeds to step S40.

In step S37, the information controller 22 determines whether or not a destination has been set to the navigation device 14.

If this determination result is "NO", the process proceeds to step S38. In step S38, the information controller 22 sets the communicable area 1a as the destination of the navigation, and the process proceeds to step S40.

If this determination result is "YES", the process proceeds to step S39. In step S39, the information controller 22 sets the communicable area 1a as the point to stop by before reaching the previously set destination, and the process proceeds to step S40.

In step S40, the navigation device 14 calculates a route based on the destination and the point to stop by and performs navigation in accordance with the route.

In step S41, the information controller 22 determines whether or not the communicable area 1a is set as the destination or the point to stop by.

If this determination result is "YES", the process proceeds to step S42. If this determination result is "NO", the process proceeds to step S51, which will be described later.

In step S42, the information controller 22 determines whether or not the magnitude of the electric field intensity of the radio waves transmitted from the base station 1 is equal to or greater than a predetermined value.

If this determination result is "NO", the information controller 22 repeats step S42. If this determination result is "YES", the process proceeds to step S43.

In step S43, the information controller 22 outputs a message notifying the occupant that the vehicle is inside the communicable area 1a in the display of the navigation device 14 and/or from the speakers.

In step S44, the information controller 22 determines whether or not the vehicle is in a stable condition in which the magnitude and alteration thereof from moment to moment of the electric field intensity is less than a predetermined value.

If this determination result is "NO", the process proceeds to step S45. In step S45, the information controller 22 orders the occupant to decelerate or stop when the vehicle is traveling, or to move and to brake when the vehicle is stopping via the navigation device 14, and the process returns to step S44.

If this determination result is "YES", the process proceeds to step S46.

In step S46, the information controller 22 transmits the emergency information stored in the storing portion 23 and the information stored in the storing portion 24 to the base station 1, the same as in step S24.

In step S47, the information controller 22 outputs a message notifying the occupant of a communication state such as ongoing or completed in the display of the navigation device 14 and/or from the speakers, and terminates the process.

In step S51, the information controller 22 determines whether or not the vehicle has reached the communicable facility.

If this determination result is "NO", the information controller repeats step S51.

If this determination result is "YES", the process proceeds to step S52. In step S52, the information controller 22 outputs a message notifying the occupant that the vehicle has reached the communicable facility in the display of the navigation device 14 and/or from the speakers.

In step S53, the information controller 22 organizes information to be transmitted to the emergency information center 2 by the communication device of the communicable facility based on the emergency information stored in the storing portion 23 and the information stored in the storing portion 24, outputs the information in the display of the navigation device 14, from the speakers, or from an appropriate printing device (not illustrated), and terminates the process.

As described, the emergency notification apparatus 10 for a vehicle of the present embodiment navigates the occupant inside of the communicable area 1a of the base station 1 for wireless communication by the navigation device 14 when the vehicle receives emergency information from another vehicle outside of the communicable area 1a. Therefore, the emergency information can be securely and swiftly transmitted to the emergency information center 2 via the base station 1.

The information controller 22 also compares the communication efficiency of transmitting the emergency information to the center 2 via the base station 1 after reaching the area 1a with that of transmitting emergency information to the center 2 via the communicable facility (i.e., a public facility) in the vicinity of the vehicle after reaching the facility. Since the occupant is navigated in accordance with the comparison result, the emergency information can be effectively transmitted to the center 2.

Furthermore, the information controller 22 transmits the position of the vehicle detected by the vehicle state sensor 13 at the time of receiving the emergency information from the other vehicle and the image data obtained by the camera 11 at the time of receiving the emergency information with the emergency information itself to the center 2. This helps those at the center 2 to locate areas in which communication with the other vehicle in an emergency is possible, and to determine the traffic conditions and weather in the vicinity of the other vehicle. Therefore, emergency vehicles can be effectively dispatched.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An emergency notification apparatus for a vehicle, comprising:
    a receiver provided in a subject vehicle, being adapted to receive emergency information from another vehicle;
    a transmitter provided in the subject vehicle, being adapted to transmit the emergency information received by the receiver to a predetermined emergency information center via a base station for wireless communication;
    a navigation device which navigates the subject vehicle to a predetermined destination; and
    a controller which controls the navigation device so as to set a communicable area of the base station as the destination when the receiver receives the emergency information outside of the communicable area and controls the transmitter so as to transmit the emergency information via the base station after the subject vehicle reaches the communicable area guided by the navigation device.

2. The emergency notification apparatus according to claim 1, further comprising
    a determination device provided in the subject vehicle, which determines which of the communicable area or a facility having a communication device in the vicinity of the subject vehicle is more effective in transmitting the emergency information to the emergency information center, wherein
    the controller controls the navigation device so as to set one of the communicable area and the facility as the destination based on a determination result of the determination device.

3. The emergency notification apparatus according to claim 2, wherein
    the determination device compares a distance between the subject vehicle and the communicable area with a distance between the subject vehicle and the facility.

* * * * *